United States Patent
Shoji et al.

(10) Patent No.: US 6,438,080 B1
(45) Date of Patent: Aug. 20, 2002

(54) DISK DRIVING METHOD AND DISK DRIVE

(75) Inventors: Masatomo Shoji; Hiromichi Nogawa, both of Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/372,301

(22) Filed: Aug. 11, 1999

(30) Foreign Application Priority Data

Aug. 11, 1998 (JP) .......................................... 10-227344

(51) Int. Cl.[7] .................................................. G11B 7/00
(52) U.S. Cl. .................... 369/47.28; 369/47.1; 369/59.1
(58) Field of Search ........................... 369/44.27, 44.28, 369/44.29, 44.34, 44.35, 44.26, 47.1, 47.15, 47.13, 47.28, 47.3, 53.1, 53.11, 53.41, 59.1, 59.14

(56) References Cited

U.S. PATENT DOCUMENTS 5,892,740 A * 4/1999 Nagasawa et al. ........ 369/44.26

FOREIGN PATENT DOCUMENTS

| JP | S56-005899 | 1/1956 |
| JP | S57-210481 | 12/1982 |
| JP | S58-091536 | 5/1983 |
| JP | 1-317228 | 12/1989 |
| JP | 7-93907 | 4/1995 |
| JP | 8-87835 | 4/1996 |
| JP | 8-255351 | 10/1996 |
| JP | 10-49969 | 2/1998 |

* cited by examiner

Primary Examiner—Muhammad Edun
(74) Attorney, Agent, or Firm—Scully, Scott, Murphy & Presser

(57) ABSTRACT

The PLL circuit in the disk drive, according to the present invention, is comprised of the following: a VCO (Voltage Controlled Oscillator) 11d, a frequency divider (DIV) 11e, a phase comparator (PC) 11a, a charge pump 11b, a low-pass filter (LPF) 11c, and a MIRR TE HOLD circuit 11f. Wherein, the LPF (Low-Pass Filter) 11c passes only low frequency components of the phase-error voltage, generated by the charge pump 11b, and provides the resulting, low frequency components passed, as a VCO control voltage, for the VCO. The phase comparator 11a compares the phase of a divided, VCO clock signal output from the frequency divider 11e, to that of an EFM signal. The divided, VCO clock signal results from the frequency-dividing of a VCO clock signal, which has been output from the VCO 11d, by the frequency divider 11e. The MIRR TE HOLD circuit 11f controls the charge pump 11b to half its own operation when the pick-up stays within a mirror region of the disk during the seeking operation of the pick-up, by outputting a PC HOLD signal to the charge pump 11b. The EFM signal results from converting a RF signal, which is picked up from a disk by the pick-up.

3 Claims, 5 Drawing Sheets

DISK DRIVING METHOD AND DISK DRIVE

BACKGROUND OF THE INVENTION

1. Field of the Invention

The present invention relates to a disk driving method and a disk drive, which stores and reads out information to/from a disk. In particular, it relates to one that can read out information in a short time.

2. Description of the Related Art

In recent years, CD-ROM drives have been drastically improved as multi-media systems have been popularized. In this situation, the demand for a high-speed disk drive, which drives a disk with a high revolving speed as fast as that of the ordinary disks, has been made. At the same time, the demand for a low-price disk drive has also been made.

In general, the digital disks such as the CD (Compact Drive) utilize the CLV (Constant Linear Velocity) control system so as to control the revolving speed of the disk. The CLV control system controls the revolving speed, thus maintaining the speed of reading out data stored in the disk, at any place including the inner circumference and the outer circumference. This requires that the revolving speed of the disk should be changed in accordance with the location of an optical pick-up, which reads in data, when the CLV control system is utilized.

When the optical pick-up is placed over the inner circumference, the revolving speed of the disk is equal to 550 rpm, whereas when it is placed over the outer circumference, the revolving speed of the disk is equal to 200 rpm. Accordingly, when the optical pick-up is moved from the outer circumference o the inner circumference, a correction is needed for the difference of 350 rpm. In order to make the access time to the disk shorter, there are two measures that can be taken. That is to say, the first one is to increase the torque of the spindle motor. The second one is to expand the capture range of a PLL (Phase Lock Loop) circuit, which is used to help in reading out a detected signal, so as to shorten the lock-on time.

However, the method of expanding the capture range, so as to shorten the lock-on time, has been coming to a deadlock. Accordingly, a solution that is different from the conventional has become necessary. Generally, strengthening the loop gain or speeding up the response can attain the improvement in the lock-on time. However, this causes the PLL circuit to react excessively to a possible noise and/or signal error, according to either one of the two solvable ways above. As a result, neither of the two ways is preferable for solving the above problem.

According to the conventional CD-ROM drive, as described above, the rotating speed of the disk needs to be changed into the speed corresponding to the location of the optical pick-up in a radius direction of the disk. However, it takes a long time for the spindle motor, which rotates the disk, to change its own rotating speed to another, thus causing a longer accessing time.

Using the conventional PLL circuit, the phase comparator outputs a DISABLE signal while the optical pick-up is moved (seeks), and outputs an ENABLE signal immediately after the optical pick-up has been moved. These operations are performed so as to prevent the PLL circuit from being locked on a different frequency during a seeking operation. During the seeking operation, since valid data discontinuously appears, the PLL circuit may be incorrectly locked on if the comparator does not output the DISABLE signal. After the optical pick-up is done seeking, the operation of the PLL circuit enters the tracking mode. In this mode, the rotating speed of the spindle motor is controlled in such a manner that the frequency of the data bits read out from the disk can fall within the capture range of the PLL circuit. After the PLL circuit has entered the locked-on mode, the data (or bits of data) can be reproduced.

However, since the conventional PLL circuits have a narrow capture range from plus to minus several percents, it takes a long time for them to become able to reproduce data. As a result, the seeking time becomes longer. In other words, the time ranging from the point of time the frequency of the data bits enters the capture range after the optical pick-up is moved (seeks), to the point of time when the PLL circuit enters the locked-on mode, is long. On the other hand, even if it has a wide capture range, the PLL circuit is locked on the frequency of an EFM (Eight to Fourteen Modulation) signal, which is the one before the optical pick-up is moved. Therefore, it also takes the CD-ROM drive a long time to become able to reproduce data. As a result, the seeking time becomes longer. Moreover, the time until the PLL circuit enters the lock-on mode, becomes longer after the optical pick-up is moved (seeks) again.

In order to shorten the above time (the data access time), the torque of the spindle motor is increased so that the rotating speed of the disk can reach the target speed. Alternatively, the capture range of the PLL circuit is enlarged or the lock-on time of the PLL circuit is shortened. However, the diameter and height of the motor restrict the increase in torque. In addition, this increase causes an increase in power consumption. Moreover, there are many problems left for enlarging the capture range and lock-on time of the PLL circuit. Thus, there is a limit in solving the above problems according to the above conventional approaches.

SUMMARY OF THE INVENTION

The present invention has been made by taking the above problems into account. Accordingly, an objective of the present invention is to provide a disk driving method and a disk drive, which can access a disk in a short time without enlarging the capture range and shortening the lock-on time. Another objective of the present invention is to provide a disk driving method and a disk drive, which can access a disk in a short time after the seeking operation, without increasing the power dissipation.

To attain the above objectives, according to an aspect of the present invention, a disk drive is provided, comprising: a signal detector with a pick-up (2, 9), which detects a signal from a disk; and a PLL unit (11), which functions so as to lock a clock signal on the signal, which has been detected by the signal detector, within the time the pick-up stays within a track region of a disk (1), but not within the time when the pick-up stays within a mirror region of the disk, during the seeking operation of the pick-up. The above reference numerals in parentheses are attached to their respective corresponding elements in FIG. 1.

According to another aspect of the present invention, a disk driving method is provided, comprising the steps of: detecting a signal from a disk (1); and functioning so as to lock a clock signal on the signal detected, within the time when a pick-up stays within a track region of a disk (1), but not within the time when the pick-up stays within a mirror region of the disk (1) during the seeking operation of the pick-up. The above reference numerals in parentheses are attached to their respective corresponding elements in FIG. 1.

BRIEF DESCRIPTION OF DRAWINGS

The above and other objects, features and advantages of the present invention, will become apparent from the following detailed description, in the embodiment section, when taken in conjunction with the accompanying drawings, wherein.

DETAILED DESCRIPTION OF THE PREFERRED EMBODIMENT

Hereafter, a disk drive, according to an embodiment of the present invention, will be explained with reference to drawings. In particular, a CD-ROM reproduction apparatus, which drives a CD-ROM disk (1) and reproduces data, will be described.

Figure 1:
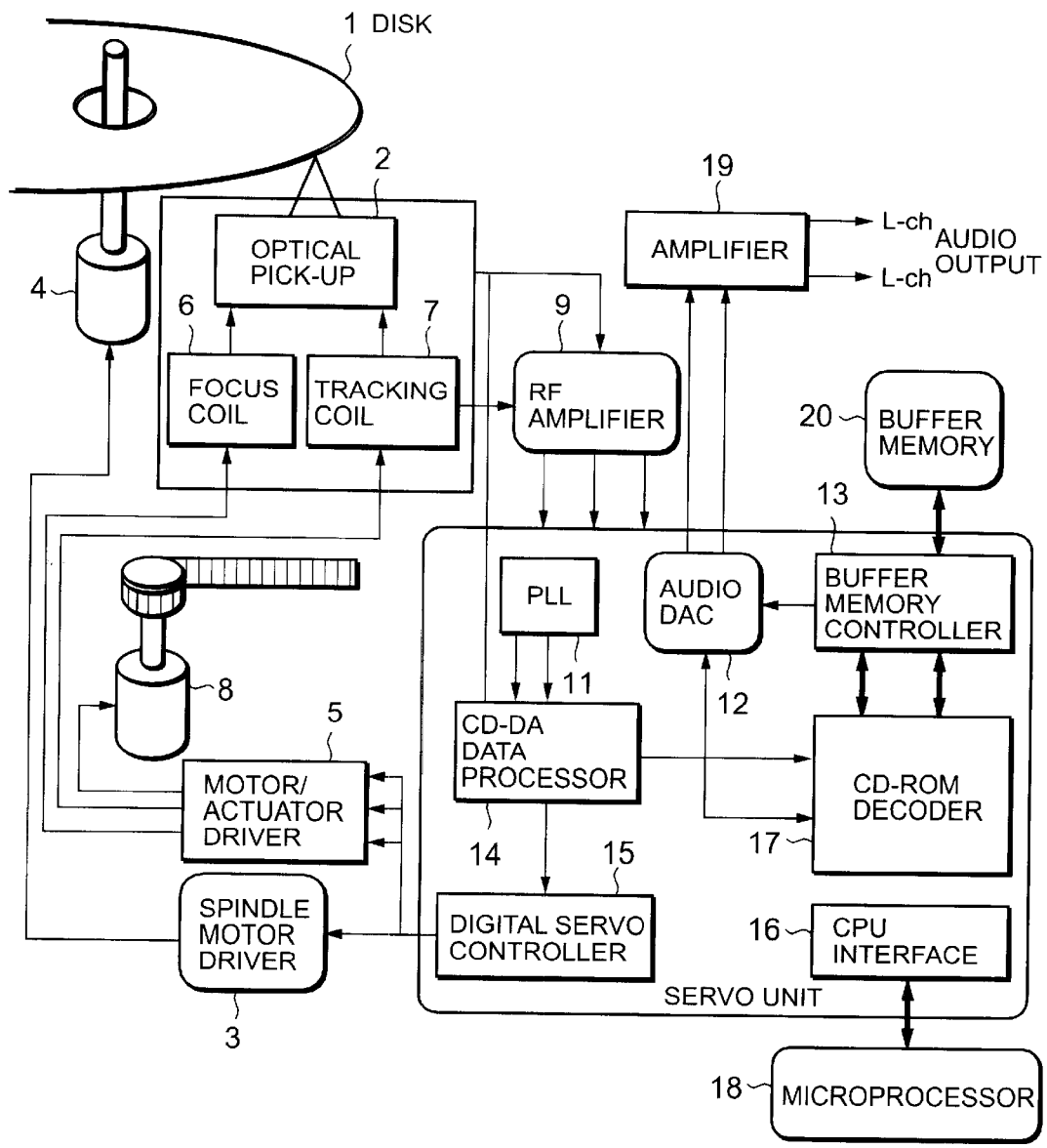
FIG. 1 illustrates the overall configuration of a disk drive, according to an embodiment of the present invention.

FIG. 1 illustrates the configuration of the CD-ROM reproduction apparatus. In this figure, we assume that digital signals are recorded in a CD-ROM disk, 1 (hereinafter, referred to as "disk 1"), in a constant, recording density, using the EFM (Eight to Fourteen Modulation) method. In order to reproduce the digital signals in a constant bit-rate, a spindle motor driver 3 controls a spindle motor 4, so as to control the rotating speed of the disk 1, in such a manner that the disk 1 can be scanned in a CLV (Constant Linear Velocity) in accordance with the current position of the optical pick-up 2.

The disk 1 is directly driven and rotated by the spindle motor 4. The CD-ROM reproduction apparatus has a servo such as the focus servo, the tracking servo, or the spindle servo as described above.

The focus servo controls the motor/actuator driver 5 in accordance with a RF (Radio Frequency) signal (a detection signal) transmitted from the optical pick-up 2, so as to adjust an electric current, which is then supplied to a focus coil 6, adjusting the focus of the optical pick-up 2. The tracking servo controls the motor/actuator driver 5 in conformity with a command from a microprocessor 18, so as to adjust the electric current, which is then supplied to a tracking coil 7, adjusting the tracking of the optical pick-up 2.

The sled motor 8 is used to move (seek) the optical pick-up 2 in the radius direction of the disk 1. The optical pick-up 2 receives and reads in the lights reflected from the disk 1, and outputs a corresponding RF signal, which indicates the locations of the pits formed on the disk 1, to a RF amplifier 9. Wherein, the lights reflected result from irradiating a laser beam onto the disk 1. The RF amplifier 9 amplifies and waveform-shapes the RF signal, outputting the resulting signals: a reproduced digital (EFM) signal, a FE (focus error) signal, a TE (tracking error) signal, a MIRR signal, etc., to a servo unit 10, which will be detailed later.

The servo unit 10 is comprised of a PLL circuit 11, an audio DAC (Digital to Analog Converter) 12, a buffer memory controller 13, a CD-DA (Compact Disk Digital Audio) data processor 14, a digital servo controller 15, a CPU interface 16, a CD-ROM decoder 17, etc.

Figure 2:
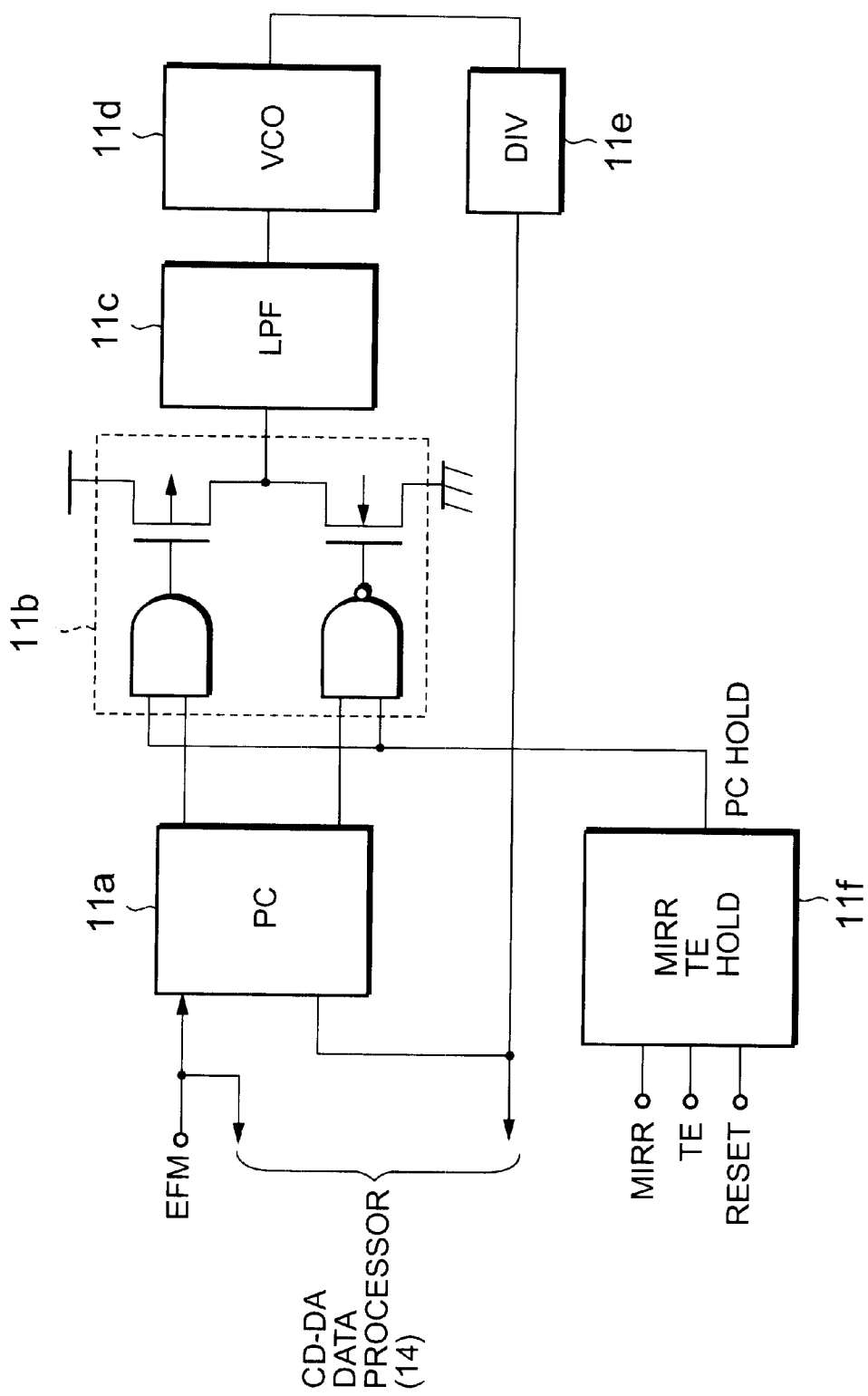
FIG. 2 illustrates the configuration of a PLL circuit, according to an embodiment of the present invention.

FIG. 2 illustrates the detailed configuration of the PLL circuit 11. In FIG. 2, the PLL circuit 11 is comprised of the following: a VCO (Voltage Controlled Oscillator) 11d, a frequency divider (DIV) 11e, a phase comparator (PC) 11a, a charge pump 11b, a low-pass filter (LPF) 11c, and a MIRR TE HOLD circuit 11f. Wherein, the LPF (Low-Pass Filter) 11c passes only low frequency components of the phase-error voltage, generated by the charge pump 11b, and provides the resulting, low frequency components passed as a VCO control voltage for the VCO. The phase comparator 11a compares the phase of a divided, VCO clock signal that is output from the frequency divider 11e, to that of the EFM signal. The frequency-divided, VCO clock signal results from frequency-dividing a VCO clock signal, which has been output from the VCO 11d, by the frequency divider 11e. The PLL circuit 11 with the configuration, as described above, outputs the frequency-divided, VCO clock signal, which has been phase-synchronized with the EFM signal transmitted from the RF amplifier 9, to the CD-DA data processor 14 (see FIG. 1). The PLL circuit 11 will be described in more detail later.

In FIG. 1, the PLL circuit 11 functions in sync with the EFM signal, output from the RF amplifier 9. Whereas, the digital servo controller 15 compares the frequency and phase of the synchronized clock signal (either the frequency-divided VCO clock signal, output from the frequency-divider 11e or the VCO clock signal, output from the VCO 11d) generated by the PLL circuit 11, to those of a reference clock signal, and generates the rotation control voltage to be supplied for the spindle motor driver 3. Wherein, the reference clock signal is the one resulting from frequency-dividing a system clock signal (not shown in the figure). The spindle motor driver 3 drives the spindle motor 4, dependent upon the rotating control voltage, in such a manner that the motor 4 can linearly rotate at a reference speed.

As the optical pick-up 2 is moved in the radius direction of the disk 1, the digital servo controller 15 open-loop-controls the spindle motor 4 to speed up or down for the time corresponding to the distance the optical pick-up 2 has moved, in conformity with the command from the microprocessor 18.

The CD-DA data processor 14 is provided with the frequency-divided, VCO clock signal and the EFM signal from the PLL circuit 11, a synchronization determining signal from a synchronization detecting circuit (not shown in the figure), and the system clock signal from a clock signal generating circuit (also not shown in the figure). The CD-DA data processor 14 demodulates the synchronized data using the synchronized clock signal, as the PLL 11 functions in sync with the EFM signal. The data demodulated by the CD-DA data processor 14 is transmitted, as a read-out data, to both the audio DAC 12 and the CD-ROM decoder 17.

The CD-ROM decoder 17 controls a buffer memory 20 via the buffer memory controller 13, decoding the read-out data. The resulting decoded, read-out data is converted by the audio DAC 12, into corresponding analog speech signal, which is then output to the amplifier 19. The amplifier 19 amplifies the analog speech signal, which is sent from the audio DAC 12, and outputs the resulting audio signal amplified.

Next, the PLL circuit 11 will be described in more detail with reference to FIG. 2. In this figure, the phase comparator 11a outputs a phase error signal, which corresponds to the phase difference between the EFM signal and the divided, VCO clock signal (comparison signal) from the frequency divider 11e. The PLL circuit 11 operates in such a manner that the phase error signal approaches zero. As a result, in the state that the PLL circuit 11 has entered the lock-on mode, the transient points (e.g., the rising edges) of the EFM signal meet those of the comparison signal. The phase error signal enters the charge pump 11b. The charge pump 11b then converts the phase error signal into a predetermined voltage level and outputs the resulting voltage level of signal to the low-pass filter 11c.

The low-pass filter 11c smoothes (i.e., eliminates high frequency components of) the signal the charge pump 11b has output, thus outputting the resulting signal as a frequency controlling signal to the voltage control oscillator 11d. The low-pass filter 11c plays an important role in determining the response characteristics of the PLL circuit 11. The LPF 11c can be a lag-lead filter, an active filter, or other related filters.

The voltage-controlled oscillator 11d outputs a VCO clock signal, the frequency of which is changed in conformity with the voltage of the frequency controlling signal, to the frequency divider 11e. It is noted that the low-pass filter 11c can be alternatively configured so as to change and output an electric current signal in place of the voltage signal. In this case, a current-controlled-type oscillator is used in place of the voltage-controlled oscillator 11d. The frequency divider 11e frequency-divides the output signal of the voltage-controlled oscillator 11d into the desired frequency of signal, and provides the phase comparator 11a with it as a feedback comparison signal.

Figure 3:
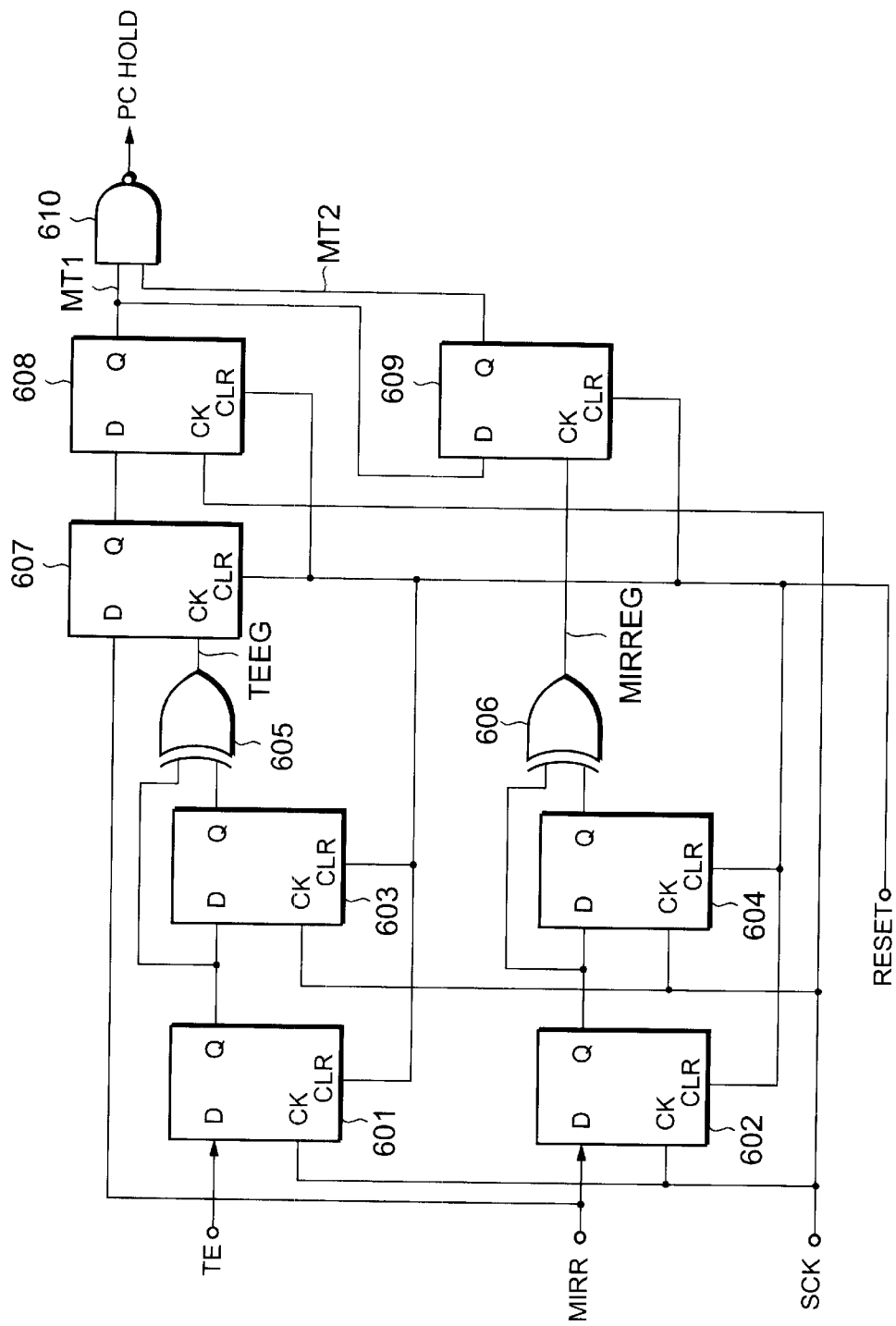
FIG. 3 illustrates the detailed configuration of a MT HOLD circuit, according to an embodiment of the present invention.

FIG. 3 illustrates the detailed configuration of the MIRR TE HOLD circuit I f, which controls the operation of the charge pump 11b. The CD-ROM reproduction apparatus, according to the embodiment of the present invention, controls the charge pump 11b in conformity with the PC HOLD signal, which is generated by the MIRR TE HOLD circuit 11f. Thereby, even if valid data of the EFM signals discontinuously appears while the optical pick-up 2 seeks (is moved), only valid data is used in the PLL circuit 11. As a result, the access time is shortened.

In FIG. 3, reference numerals 601 to 604, and 607 to 609 depict D-type flip-flop circuits (delayed-type flip-flop circuits). Reference numerals 605 and 606 depict exclusive-OR gates, and reference numeral 610 depicts a NAND gate. It is noted that a clock signal generating circuit (not shown in the figure) provides each of the CK terminals (clock signal terminals) of the respective D-type flip-flop circuits 601 to 604, and 608 with a system clock signal (SCK). A reset signal (RESET) is provided for each of the CLR terminals (data clearing terminals) of the D-type flip-flop circuits 601 to 604, and 607 to 609.

The TE signal (Tracking Error signal), as described above, is provided for the D terminal of the D-type flip-flop circuit 601. The Q terminal of the D-type flip-flop circuit 601 is connected to both the D terminal of the D-type flip-flop circuit 603 and one of the input terminals of the exclusive-OR gate 605. The Q terminal of the D-type flip-flop circuit 603 is connected to the other input terminal of the exclusive-OR gate 605. The output terminal of the exclusive-OR gate 605 is connected to the CK terminal of the D-type flip-flop 607. The MIRR signal, as described above, is provided for the D terminal of the D-type flip-flop 607. The Q terminal of the D-type flip-flop 607 is connected to the D terminal of the D-type flip-flop circuit 608. The Q terminal of the D-type flip-flop circuit 608 is connected to both one of the input terminals of the NAND gate 610 and the D terminal of the D-type flip-flop 609. The MIRR signal is provided for the D terminal of the D-type flip-flop circuit 602. The Q terminal of the D-type flip-flop circuit 602 is connected to both the D terminal of the D-type flip-flop circuit 604 and one of the input terminals of the exclusive-OR gate 606. The Q terminal of the D-type flip-flop circuit 604 is connected to the other terminal of the exclusive-OR gate 606. The output terminal of the exclusive-OR gate 606 is connected to the CK terminal of the D-type flip-flop circuit 609. The Q terminal of the D-type flip-flop circuit 609 is connected to the other one of the NAND gate 610. The output terminal of the NAND gate 610 is connected to the charge pump 11b, providing a PC HOLD signal for the charge pump 11b.

Incidentally, to explain the MIRR TE HOLD circuit in FIG. 3 in more detail, we call the signal that is output from the output terminal of the exclusive-OR gate 605 and provided for the CK terminal of the D-type flip-flop circuit 607, the TE EG signal. Also, the signal output from the output terminal of the exclusive-OR gate 606 and provided for the CK terminal of the D-type flip-flop circuit 609 is called the MIRR EG signal. The signal output from the Q terminal of the D-type flip-flop circuit 608 and provided for one of the NAND gate 610 is called the MT1 signal. Lastly, the signal output from the Q terminal of the D-type flip-flop circuit 609 and provided for the other one of the NAND gate 610 is called the MT2 signal.

Next, the seeking operation of the CD-ROM reproduction apparatus, according to the present invention, will be described in detail with reference to FIG. 4.

The CD-ROM reproduction apparatus, which is of the CLV (Constant Linear Velocity) type, controls the rotating speed of the disk 1 to become equal to the preferable speed for each position where the optical pick-up stays in the radius direction of the disk 1. Therefore, when the optical pick-up 2 is moved over to a target address of the disk 1, the rotating speed of the spindle motor 4 needs changing from the current rotating speed necessary for the current address to the rotating speed necessary for the target address.

Figure 4:
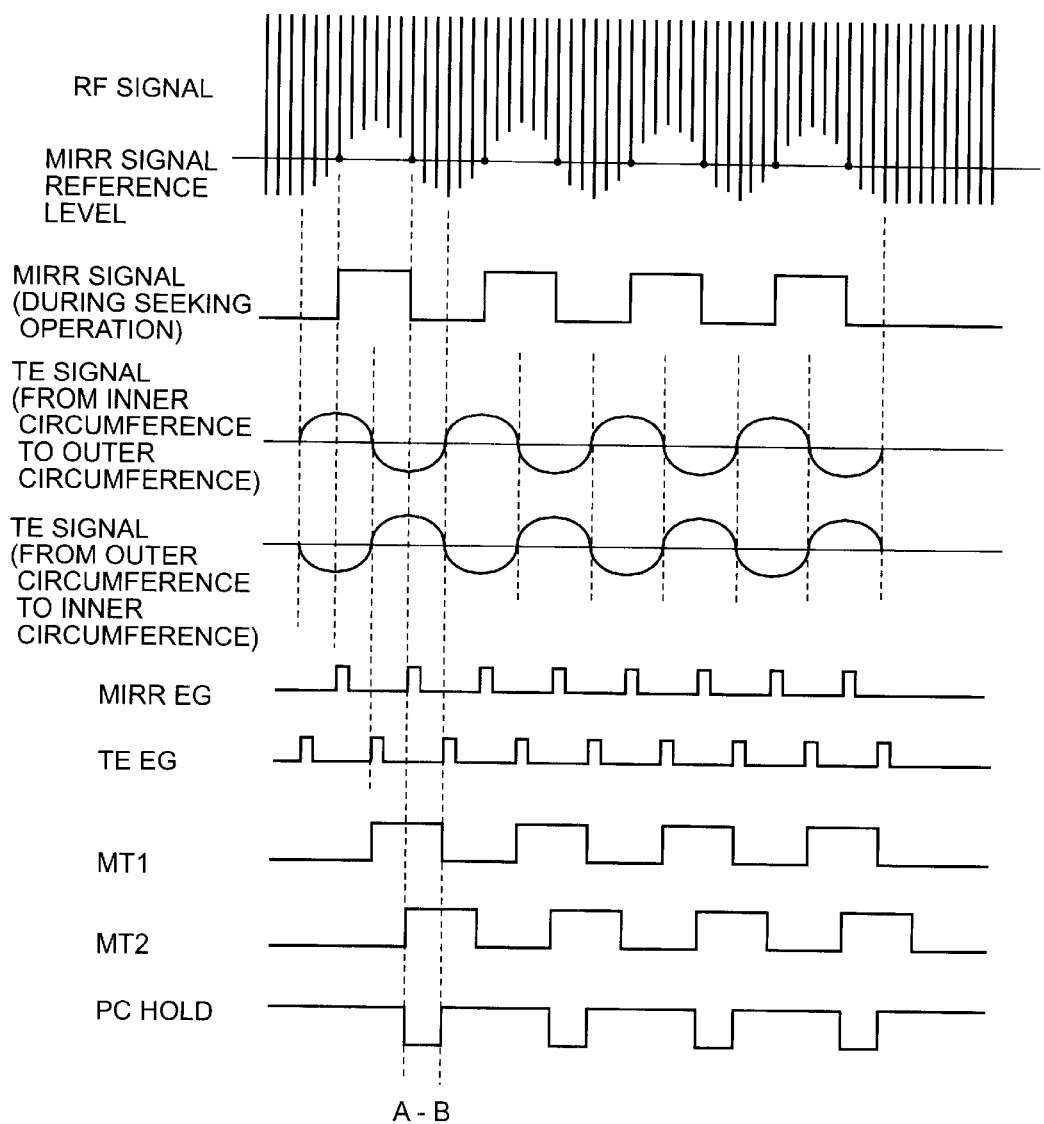
FIG. 4 is a timing-chart showing the operation of the MT HOLD circuit.

The level (envelope) of the RF signal, output from the optical pick-up 2, changes during the seeking operation, as shown in FIG. 4. It is noted that the convex portions of the RF signal correspond to the respective track regions of the disk 1 on which data is stored; whereas the concave portions of the RF signal correspond to the mirror regions of the disk 1, which data is not stored.

The MIRR signal indicates the mirror regions, and is generated by comparing the level of RF signal to a predetermined reference level by a comparator (not shown in the figure). The MIRR signal is high level while the optical pick-up 2 moves over the mirror regions.

In the case where the optical pick-up 2 moves from the inner circumference to the outer circumference of the disk 1, the TE signal behaves as shown by the upper form of the TE signal in FIG. 4. On the other hand, in the case where the optical pick-up 2 moves from an outer circumference of the disk 1 to an inter circumference, the TE signal behaves as shown by the other form in FIG. 4. As is apparent from the two forms of the TE signal in FIG. 4, when the amplitude of the RF signal is highest, the amplitude of the TE signal is the lowest. According to the upper form of the TE signal in FIG. 4, the TE signal is a positive value as the amplitude of the RF signal decreases, whereas it is a negative value as the amplitude of the RF signal increases. On the other hand, according to the lower form of the TE signal in FIG. 4, the TE signal is a negative value as the amplitude of the RF signal decreases, whereas it is a positive value as the amplitude of the RF signal increases.

The MT HOLD circuit 11f, which receives both the MIRR signal and the TE signal, as described above, functions as follows. The MT HOLD circuit 11f detects the edge of the MIRR signal received, and a resulting, edge detection signal or a MIRR EG signal (See FIG. 3) is transmitted to the D-type flip-flop 609. The zero-crossing point of the TE signal is detected by the area of the circuit made up of the D-type flip-flops 601 and 603 and exclusive-OR gate 605, and a resulting zero-crossing detection signal or TE EG signal is transmitted to the D-type flip-flop 607. The MIRR signal is latched in sync with the edge of the TE EG signal, by the area of the circuit made up of the D-type flip-flops 607 and 608, and a resulting signal or MT1 is transmitted to the NAND gate 610. The MT1 signal is latched in sync with the edge of the MIRR EG signal, by the D-type flip-flop 609, and a resulting signal or MT2 is transmitted to the NAND gate 610.

The signals MT1 and MT2 are NANDed by the NAND gate 610, which then outputs a resulting PC HOLD signal. The PC HOLD signal indicates a valid duration of the RF signal during the seeking operation. In FIG. 4, a low level PC HOLD signal during the time A-B (see FIG. 4) indicates that the RF signal is valid, namely, that the optical pick-up 2 stays or moves within a recording track of the disk 1.

Next, the operation of the MT HOLD circuit 11f will be explained in more detail while referencing FIG. 3. The D-type flip-flop 601 latches the TE signal in sync with the system clock signal SCK, outputting a resulting synchronized TE signal to the D-type flip-flop 603. The D-type flip-flop 603 latches the synchronized TE signal in sync with, again, the system clock signal SCK, outputting a resulting, single SCK-cycle delayed, synchronized TE signal to the exclusive-OR gate 605. The outputs of the respective D-type flip-flops 601 and 602 are then subjected to an exclusive-OR calculation by the exclusive-OR gate 605, which then outputs the resulting TE EG signal, which indicates the location of the edge of the TE signal, to the D-type flip-flop 607.

The D-type flip-flop 607 latches the MIRR signal in sync with the TE EG signal, outputting a resulting, synchronized MIRR signal to the D-type flip-flop 608. The D-type flip-flop 608 then latches it in sync with the system clock signal SCK, outputting a resulting signal MT1 to the NAND gate 610.

The D-type flip-flop 602 latches the MIRR signal in sync with the system clock signal SCK, outputting a resulting, synchronized MIRR signal. The D-type flip-flop 604 then latches the output of the D-type flip-flop 602 in sync with the system clock signal SCK, outputting a resulting, single-SCK-cycle-delayed, synchronized MIRR signal to the exclusive-OR gate 606. The exclusive-OR gate 606 then receives and subjects the outputs of the respective D-type flip-flops 602 and 604 to an exclusive-OR calculation, outputting a resulting MIRR EG signal, which indicates the location of the edge of the MIRR signal, to the D-type flip-flop 609.

The D-type flip-flop 609 latches the signal MT1 in sync with the MIRR EG signal, outputting a resulting, synchronized signal MT2 to the NAND gate 610. The signals MT1 and MT2 are then NANDed by the NAND gate 610, which generates a low level PC HOLD signal in the case where both the signals MT1 and MT2 are high level.

By controlling the operation of the charge pump 11b in conformity with the PC HOLD signal generated, the LPF 11c is allowed to receive a signal resulting from the phase comparison done by the PC 11a only when both the signals MT1 and MT2 are high level. As a result, the PLL circuit can operate with the valid EFM signal even during a seeking operation, so the changing RF signal (i.e., the EFM signal) can be properly and quickly tracked.

As described above, the phase of the TE signal, when the optical pick-up 2 seeks or is moved from the inner circumference of the disk 1 to the outer circumference, is opposite to that of the signal when the optical pick-up 2 is moved in the opposite direction. However, the above difference in phase can be virtually ignored using the HOLD circuit 11f, which detects the edge of the TE signal, generates a resulting edge detection signal or TE EG signal and utilizes it.

In addition, even if the edges of the respective MIRR signal and TE signal include a lot of noise and cannot be normally detected, a stable PC HOLD signal can be obtained by latching the MIRR signal in sync with the TE EG signal by the D-type flip-flop 607. Wherein, the MIRR EG signal indicates the location of the edge of the MIRR signal, whereas the TE EG signal indicates the zero-crossing point of the TE signal.

Moreover, the MT HOLD circuit 11f controls the operation of the charge pump 11b by providing the charge pump with the PC HOLD signal, which is generated by subjecting the signals MT1 and MT2 to a NAND-calculation. Thereby, only the valid part of the RF signal is extracted and provided for the PLL circuit 11, even during a seeking operation where valid data appears discontinuously. Wherein, the signal MT1 has been generated by latching the MIRR signal in sync with the edge of the TE signal, whereas the signal MT2 has been generated by latching the signal MT1 in sync with the edge of the MIRR signal.

Figure 5:
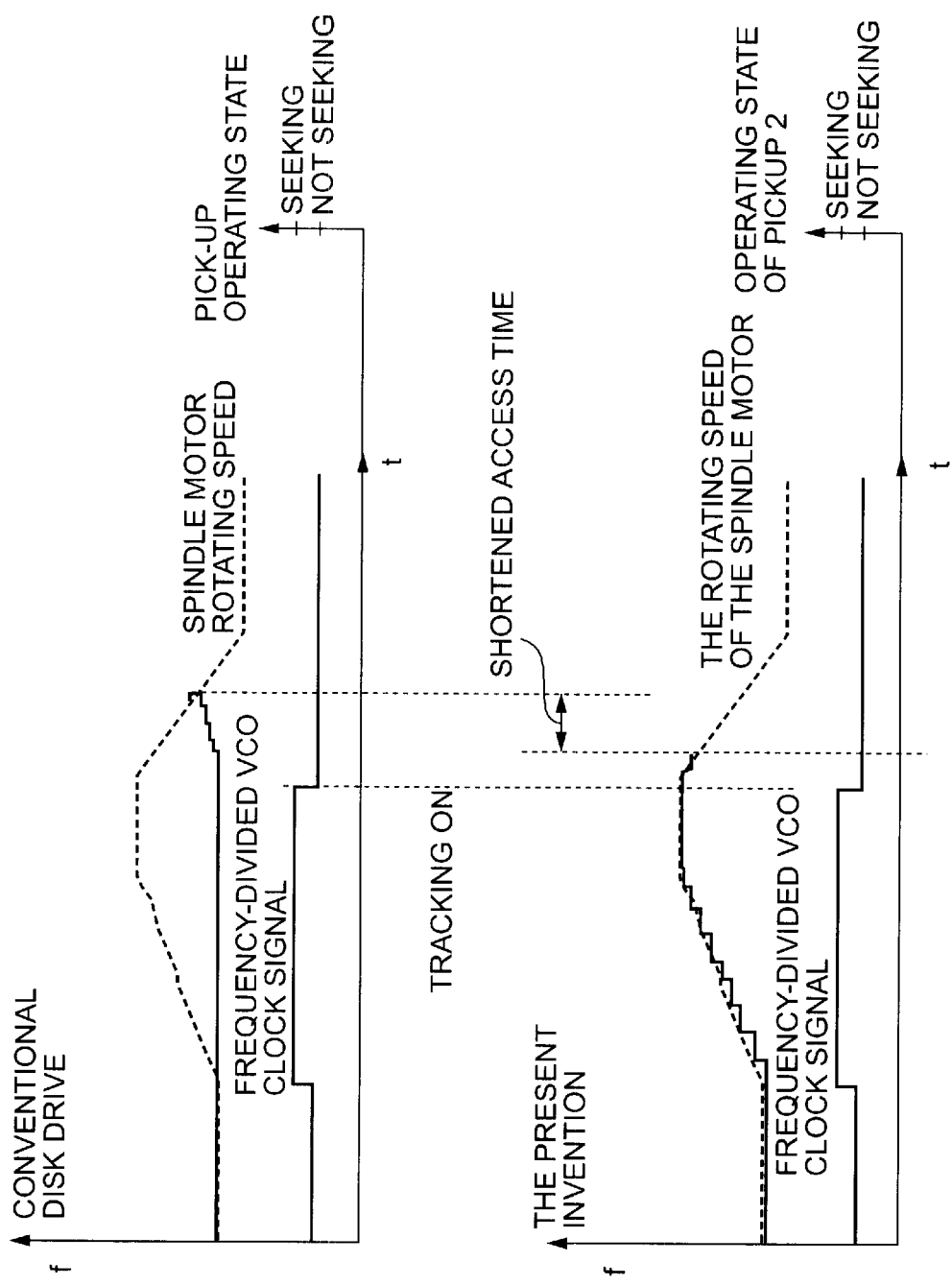
FIGS. 5a and 5b are graphs showing a beneficial result from the disk drive, according to the embodiment of the present invention.

FIGS. 5a and 5b are graphs showing the respective performances of conventional disk drives and the disk drive according to the present invention. Wherein, the vertical lines on the left in the respective FIG. 5(a) and 5(b) represent the frequency (i.e., the revolving speed) of the spindle motor 4, and the frequency-divided VCO clock signal. Whereas, the vertical lines on the right in the respective FIG. 5(a) and 5(b) represent the operating state of the pick-up: either a seeking state or a not seeking state. Both the horizontal axes in the respective FIGS. 5a and 5b represent time.

In FIG. 5(a), the upper two lines correspond to the left, vertical line, whereas the other line corresponds to the right, vertical line. Wherein, the broken line of the upper two lines represents the revolving speed (frequency) of a spindle motor, whereas the solid line of the upper two represents the frequency of the frequency-divided VCO clock signal output from the frequency divider in the conventional PLL circuit. The other solid line, which corresponds to the right, vertical line, represents the state of the optical pickup: either a seeking state or a not seeking state. As apparent from FIG. 5(a), during the seeking operation, the frequency of frequency-divided VCO clock signal is distant from that of the spindle motor. As a result, it takes more time before the conventional PLL can lock on the frequency of the spindle motor 4.

In FIG. 5(b), the upper two lines correspond to the left, vertical line, whereas the other line corresponds to the right, vertical line. Wherein, the broken line of the upper two lines represents the revolving speed (frequency) of the spindle motor 4, whereas a solid line of the upper two represents the frequency of the frequency-divided VCO clock signal output from the frequency divider 11e (see FIG. 2) in the PLL circuit, according to the present invention. The other solid line, which corresponds to the right, vertical line, represents the state of the optical pick-up: either a seeking state or a not seeking state. As apparent from FIG. 5(b), even during the seeking operation, and even though there is a large change in the frequency of the EFM signal before and after the seeking operation, the PLL circuit functions to lock the frequency-divided VCO clock signal on the EFM signal in a shorter time than the conventional one does. As a result, according to the present invention, it takes a much shorter time to access data stored in the disk 1. Specifically, after the seeking operation has been completed, it takes the conventional disk drive approximately 80 ms to be able to read in data from the disk. However, the disk drive, according to the present invention, only takes approximately 30 ms.

It is noted that the present invention is not limited to the configuration of the above embodiment. The following modified forms of the embodiment are possible.

(1) In the above embodiment, it is described that the present invention is implemented in a CD-ROM apparatus. However, the present invention is not limited to the CD-ROM apparatus. The present invention can be also implemented in other disk drives such as the DVD (Digital Versatile Disk), the MD (Mini Disk), etc., with each reading out PCM (Pulse Code Modulation) information recorded on a disk using the CLV (Constant Linear Velocity) approach, and providing a TE (Tracking Error) signal and a MIRR signal as well as a RF signal.

(2) The present invention can be implemented in a system with a PLL circuit, which extracts a timing signal from modulated data that has the possibility to be self-locked. It is unnecessary that the timing signal be equal to, for example, the TE signal and the MIRR signal, as described above. Namely, the present invention can be implemented in a system from which a timing signal indicates a valid RF signal region during the seeking operation.

(3) In the above embodiment, the PC HOLD signal is used to mask the resulting signal from the phase comparison, thus prohibiting this signal from entering the charge pump 11b. However, the present invention is not limited to this processing structure. For example, the structure of masking the output signal of the charge pump 11b or the structure of masking both the EFM signal and the output from the frequency-divider 11e can be alternatively used for the PLL circuit. Namely, a structure, in which the voltage-controlled oscillator can keep a self-running frequency, can be used in the present invention.

(4) In the above embodiment, it is described that the disk 1, which is recorded based upon the CLV approach, is also controlled based upon the CLV approach. The present invention is not limited to this. The present invention can also be implemented in such a system that a disk recorded based upon the CLV approach is controlled based upon the CAV (Constant Angular Velocity) approach. In this case, when the optical pick-up moves from the inner circumference to the outer circumference, or vise versa, the revolving speed of the disk is not changed. Therefore, the bit-frequency of the RF signal (EFM signal) must change drastically. Specifically, the bit-frequency of the EFM signal is low at the inner circumference, and conversely, the bit-frequency of the EFM signal is high at the outer circumference. Unlike the CLV control approach, the CAV control approach does not control the spindle motor so as to make the linear revolving velocity of the disk constant. As a result, the PLL circuit is the only one that tracks the changing frequencies of the EFM signal so as to make it possible to read out data. Therefore, the lock-on time of the PLL determines the data access time. In this respect, since the PLL circuit, according to the present invention, tracks the changing frequency of the EFM signal even during the seeking operation, once the seeking operation is completed, the lock-on time is short.

(Results of the Present Invention)

As described above, a disk drive, according to the present invention, provides the following, beneficial results:

(1) Once the seeking operation is completed, the time before data can be read out is short. As a result, the data access time is also short;

(2) Without any effort to shorten the lock-on time by improving the torque of the spindle motor and/or the capture range of the PLL circuit, the data access time can be shortened.

(3) Since a high torque spindle motor is unnecessary, a small motor can be used in the disk drive, according to the present invention. This enables the size of the disk drive to be small, and also causes a reduction of the dissipation power of the disk drive.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A optical disk drive for interacting with a phase change-type optical disk, comprising:

a signal detector for detecting a signal from an optical disk through a pick-up;

a PLL circuit for generating a clock signal synchronized with said signal; and a control circuit for activating and de-activating said PLL circuit when said pick-up moves in a radius direction over said optical disk during a seeking operation;

wherein said control circuit activates said PLL circuit when said pick-up crosses an inner track region and an outer track region of said optical disk, and de-activates said PLL circuit when said pick-up crosses a mirror region disposed between said inner track region and outer track region.

2. The optical disk drive, according to claim 1, wherein said PLL circuit comprises a charge pump circuit, and said control circuit receives a mirror signal and controls the on/off operation of said charge pump circuit based on said mirror signal; and wherein said mirror signal is activated when said pick-up crosses said mirror region.

3. The optical disk drive, according to claim 2, wherein said control circuit receives a tracking error signal, and latches said mirror signal, in synchronization, with said tracking error signal.

* * * * *